US010356494B2

(12) United States Patent
Corbin et al.

(10) Patent No.: US 10,356,494 B2
(45) Date of Patent: Jul. 16, 2019

(54) WIRELESS SENSOR SYSTEM WITH DYNAMIC HEARTBEAT MESSAGE RATE

(71) Applicant: Sikorsky Aircarft Corporation, Stratford, CT (US)

(72) Inventors: Scott Alan Corbin, Port Matilda, PA (US); Eric Humenay, Morrisdale, PA (US)

(73) Assignee: SIKORSKY AIRCRAFT CORPORATION, Startford, CT (US)

( * ) Notice: Subject to any disclaimer, the term of this patent is extended or adjusted under 35 U.S.C. 154(b) by 62 days.

(21) Appl. No.: 15/343,489

(22) PCT Filed: May 6, 2015

(86) PCT No.: PCT/US2015/029437
§ 371 (c)(1),
(2) Date: Nov. 4, 2016

(87) PCT Pub. No.: WO2015/171740
PCT Pub. Date: Nov. 12, 2015

(65) Prior Publication Data
US 2018/0227649 A1  Aug. 9, 2018

Related U.S. Application Data

(60) Provisional application No. 61/989,649, filed on May 7, 2014.

(51) Int. Cl.
*G08C 19/22* (2006.01)
*H04Q 9/00* (2006.01)
(Continued)

(52) U.S. Cl.
CPC ............... *H04Q 9/00* (2013.01); *H04W 4/38* (2018.02); *H04W 28/04* (2013.01); *H04W 84/22* (2013.01);
(Continued)

(58) Field of Classification Search
CPC ..... H04Q 9/00; H04Q 2209/40; H04W 28/04; H04W 84/18; H04W 4/38; H04W 88/22
(Continued)

(56) References Cited

U.S. PATENT DOCUMENTS 6,249,808 B1 * 6/2001 Seshadri ................. H04L 29/06
709/203
6,945,103 B1 * 9/2005 Lee ..................... B60C 23/0408
73/146.5
(Continued)

FOREIGN PATENT DOCUMENTS

EP  2725740 A1  4/2014

OTHER PUBLICATIONS

Echelon, "ISI Protocol Specification Version 3", Echelon Corporation, 078-0300-01F, Copyright 2005, 2007.
(Continued)

*Primary Examiner* — Zhen Y Wu
(74) *Attorney, Agent, or Firm* — Cantor Colburn LLP

(57) ABSTRACT

A wireless sensor system includes a wireless sensor node with a sensor interface that interfaces with sensing circuitry, a wireless interface to communicate with a wireless access point, at least one processor, and memory having instructions stored thereon that, when executed by the at least one processor, cause the wireless sensor node to set a heartbeat message rate to a first heartbeat message rate. Heartbeat messages are sent periodically at the first heartbeat message rate, and sensor data are acquired through the sensor interface. The heartbeat message rate increases to a second heartbeat message rate based on a determination that the sensor data have been acquired and are ready to transmit. The sensor data are transmitted in one or more heartbeat messages at the second heartbeat message rate until all
(Continued)

sensor data have been transmitted, then the heartbeat message rate is returned to the first heartbeat message rate.

16 Claims, 4 Drawing Sheets

(51) Int. Cl.
    *H04W 4/38*     (2018.01)
    *H04W 84/22*     (2009.01)
    *H04W 28/04*     (2009.01)
    *H04W 84/18*     (2009.01)

(52) U.S. Cl.
    CPC ......... *H04Q 2209/40* (2013.01); *H04W 84/18* (2013.01)

(58) Field of Classification Search
    USPC .................................................. 340/870.07
    See application file for complete search history.

(56) References Cited

U.S. PATENT DOCUMENTS

| | | | |
|---|---|---|---|
| 2003/0025612 A1 | 2/2003 | Holmes et al. | |
| 2004/0193719 A1* | 9/2004 | Yang | H04L 47/10 709/229 |
| 2007/0080288 A1* | 4/2007 | Lim | G01J 1/02 250/227.21 |
| 2007/0286081 A1* | 12/2007 | Corazza | H04L 1/0002 370/236 |
| 2008/0025341 A1* | 1/2008 | Rao | H04W 72/048 370/468 |
| 2008/0253327 A1 | 10/2008 | Kohvakka et al. | |
| 2010/0268303 A1* | 10/2010 | Mitchell | A61N 1/37211 607/60 |
| 2011/0092164 A1 | 4/2011 | Spanhake | |
| 2012/0002537 A1* | 1/2012 | Bao | H04W 24/04 370/221 |
| 2012/0087325 A1 | 4/2012 | Proctor, Jr. | |
| 2012/0110173 A1* | 5/2012 | Luna | H04L 69/28 709/224 |
| 2012/0144018 A1* | 6/2012 | Fried | H04L 12/6418 709/224 |
| 2012/0178487 A1* | 7/2012 | Schmidtke | H04L 69/163 455/517 |
| 2012/0315862 A1* | 12/2012 | Okano | H04W 4/90 455/73 |
| 2013/0225117 A1* | 8/2013 | Giacoletto | H04W 4/90 455/404.2 |
| 2014/0031002 A1* | 1/2014 | Ranki | G01S 5/0027 455/404.2 |
| 2014/0195071 A1* | 7/2014 | Hunt | G07C 5/085 701/1 |
| 2015/0101702 A1* | 4/2015 | Dean | B60C 23/003 141/4 |
| 2015/0200870 A1* | 7/2015 | Hui | H04L 47/22 709/226 |
| 2016/0182184 A1* | 6/2016 | Nagasaka | H04B 10/1143 398/2 |

OTHER PUBLICATIONS

Narendran Rajagopalan, "Modified Power Save Model for Better Energy Efficiency and Reduced Packet Latency", Department of Computer Science and Engineering, National Institute of Technology, India, American Journal of Engineering and Applied Sciences, ISSN: 1941-7020, 2012.

Olivier Dousse, "Latency of Wireless Sensor Networks With Uncoordinated Power Saving Mechanisms", MobiHoc '04, ACM 1-58113-849-0/04/0005, May 24-26, 2004.

International Search Report; International Application No. PCT/US15/29437; International Filing Date: Jun. 5, 2015; dated Aug. 17, 2015; 15 pages.

\* cited by examiner

WIRELESS SENSOR SYSTEM WITH DYNAMIC HEARTBEAT MESSAGE RATE

BACKGROUND OF THE INVENTION

The subject matter disclosed herein generally relates to wireless systems, and more particularly to a wireless sensor system with a dynamic heartbeat message rate.

In a wireless sensor system, wireless sensor nodes communicate with a server to provide both status information and sensor data. Messages sent from the wireless sensor nodes are typically referred to as heartbeat messages, as they are periodic and indicate that the wireless sensor nodes are operating. Heartbeat message transmission consumes energy, which in turn, reduces battery life of the wireless sensor nodes. A faster heartbeat message rate consumes energy at a faster rate. A slower heartbeat message rate decreases data transfer rate and increases data transfer latency.

BRIEF DESCRIPTION OF THE INVENTION

According to an aspect of the invention, a wireless sensor system includes a wireless sensor node that includes a sensor interface that interfaces with sensing circuitry, a wireless interface to communicate with a wireless access point, and at least one processor. The wireless sensor node also includes memory having instructions stored thereon that, when executed by the at least one processor, cause the wireless sensor node to set a heartbeat message rate of the wireless sensor node to a first heartbeat message rate. Heartbeat messages are sent periodically on the wireless interface to the wireless access point at the first heartbeat message rate, and sensor data are acquired through the sensor interface. The heartbeat message rate increases to a second heartbeat message rate based on a determination that the sensor data have been acquired and are ready to transmit. The sensor data are transmitted in one or more heartbeat messages on the wireless interface to the wireless access point at the second heartbeat message rate until all of the sensor data have been transmitted. The heartbeat message rate is lowered back to the first heartbeat message rate based on a determination that all of the sensor data have been transmitted.

In addition to one or more of the features described above or below, or as an alternative, further embodiments could include status information in the heartbeat messages sent at the first heartbeat message rate, and the status information and the sensor data in the one or more heartbeat messages sent at the second heartbeat message rate. The status information can include a status of a power supply of the wireless sensor node.

In addition to one or more of the features described above or below, or as an alternative, further embodiments could include reduction of the second heartbeat message rate based on a determination that a power level of the power supply is below a low power operation threshold.

In addition to one or more of the features described above or below, or as an alternative, further embodiments could include a second wireless sensor node, where the second wireless sensor node transmits sensor data at a third heartbeat message rate that is greater than the first heartbeat message rate. The first heartbeat message rate, the second heartbeat message rate, and the third heartbeat message rate can be configurable by a server operably coupled to the wireless access point. The wireless sensor node can interface with a first type of sensing circuitry, and the second wireless sensor node can interface with a second type of sensing circuitry that may have a different sampling rate than the first type of sensing circuitry.

In addition to one or more of the features described above or below, or as an alternative, further embodiments could include monitoring of a communication error rate with respect to the wireless access point and reduction of the second heartbeat message rate based on detection of an increased communication error rate.

In addition to one or more of the features described above or below, or as an alternative, further embodiments could include where the wireless sensor node is configurable to communicate with the wireless access point at a rate greater than the first heartbeat message rate for wireless sensor node firmware update transmissions.

According to other aspects of the invention, a method of dynamic heartbeat message rate adjustment in a wireless sensor system is provided. The method includes setting a heartbeat message rate of a wireless sensor node to a first heartbeat message rate, and sending heartbeat messages periodically from the wireless sensor node to a wireless access point at the first heartbeat message rate. Sensor data are acquired at the wireless sensor node. The heartbeat message rate is increased to a second heartbeat message rate based on determining that the sensor data have been acquired and are ready to transmit. The sensor data are transmitted in one or more heartbeat messages from the wireless sensor node to the wireless access point at the second heartbeat message rate until all of the sensor data have been transmitted. The heartbeat message rate is lowered back to the first heartbeat message rate based on a determination that all of the sensor data have been transmitted.

According to further aspects of the invention, a wireless sensor node includes a sensor interface that interfaces with sensing circuitry, a data acquisition controller to acquire sensor data via the sensor interface, a power supply monitor to determine a status of a power supply of the wireless sensor node, and a wireless interface to communicate with a wireless access point. The wireless sensor node also includes a heartbeat rate controller that causes the wireless sensor node to set a heartbeat message rate of the wireless sensor node to a first heartbeat message rate to periodically send heartbeat messages including the status of the power supply to the wireless access point. The heartbeat rate controller increases the heartbeat message rate to a second heartbeat message rate to transmit the sensor data in one or more heartbeat messages to the wireless access point based on a determination that the sensor data have been acquired and are ready to transmit. The heartbeat rate controller also lowers the heartbeat message rate back to the first heartbeat message rate based on a determination that all of the sensor data have been transmitted.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, a dynamic heartbeat message rate for heartbeat messages in a wireless sensor system increases when one or more samples of sensor data are available to be transferred from a wireless sensor node to a wireless access point. Rather than waiting a full heartbeat message interval, the sensor data can be immediately transferred at a higher rate to decrease data latency. Upon completion of sensor data transmission, the wireless sensor node decreases the heartbeat message rate to provide periodic status to the wireless access point at a reduced rate, which also lowers a rate of power consumption at the wireless sensor node.

Figure 1:
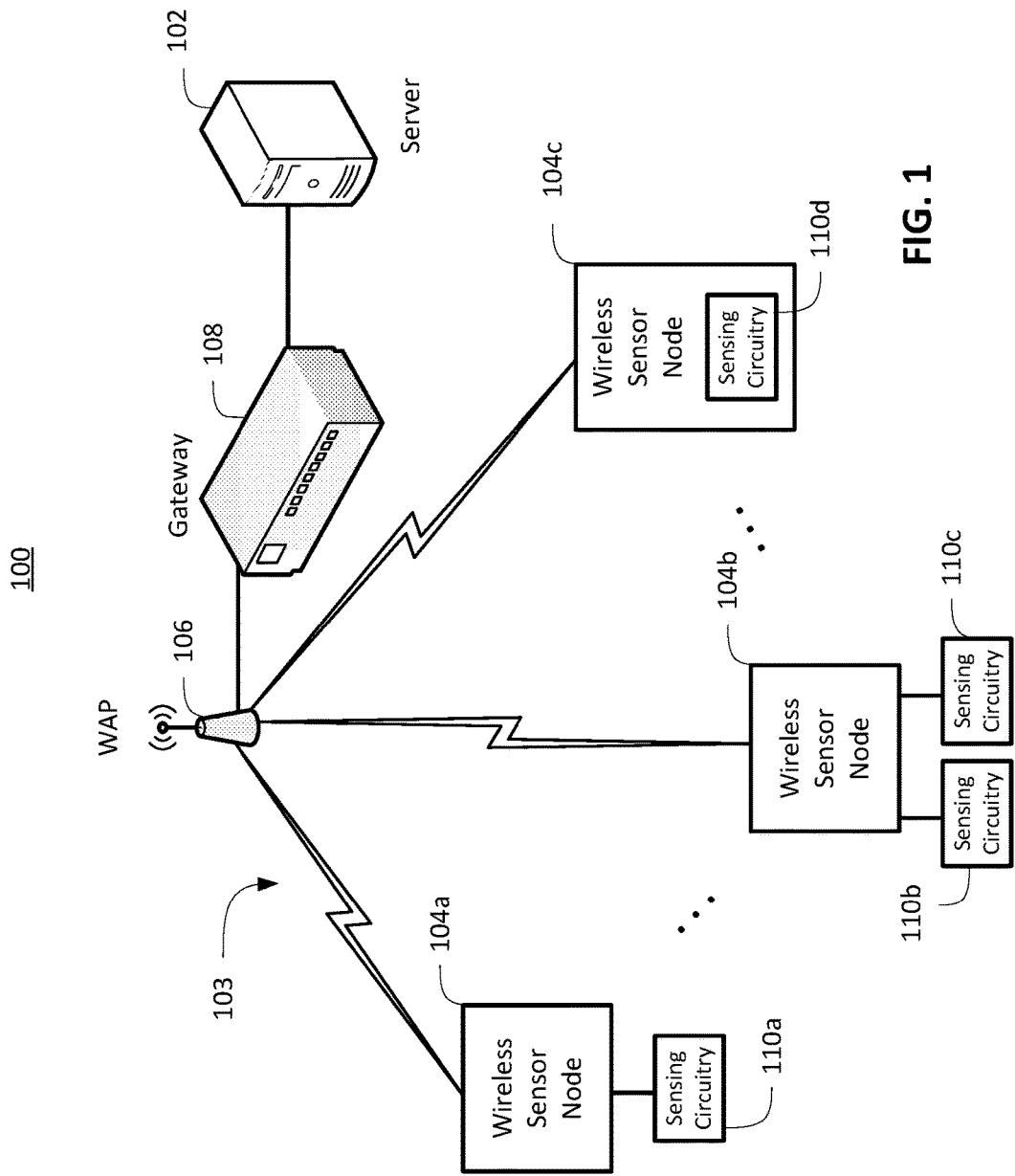
FIG. 1 schematically depicts a wireless sensor system in accordance with an embodiment.

FIG. 1 schematically depicts a wireless sensor system 103 as part of a system 100 in accordance with an embodiment. The wireless sensor system 103 includes a plurality of wireless sensor nodes 104 configured to communicate wirelessly with a wireless access point 106 of the system 100. In an exemplary embodiment, the wireless access point 106 is operably coupled to a server 102 through a gateway 108. The gateway 108 can provide protocol translation, rate conversion, fault isolation, and/or signal translation between the wireless access point 106 and the server 102. In an alternate embodiment, the wireless access point 106 is directly coupled to the server 102. The server 102 is a host system that can control configuration of the wireless sensor nodes 104, initiate actions at the wireless sensor nodes 104, and collect data from the wireless sensor nodes 104. The server 102 can include processing circuitry, memory, communication interfaces, input/output interfaces, and other computer system hardware and software elements known in the art.

In the example of FIG. 1, there are three instances of the wireless sensor nodes 104 depicted as wireless sensor nodes 104a, 104b, and 104c, although it will be understood that any number of wireless sensor nodes 104 can be included in the wireless sensor system 103. The wireless sensor nodes 104 can have a variety of sensor configurations, generally referred to as sensing circuitry 110. For instance, wireless sensor node 104a includes a single instance of sensing circuitry 110a that is external to the wireless sensor node 104a. Wireless sensor node 104b includes multiple instances of sensing circuitry 110, depicted as sensing circuitry 110b and 110c. Wireless sensor node 104c includes sensing circuitry 110d that is internal to the wireless sensor node 104c. While only one or two instances of sensing circuitry 110 are depicted per wireless sensor node 104, each wireless sensor node 104 may support any number of sensing circuitry 110 instances (e.g., 1, 2, 4, 8, 16, 32, etc.).

The sensing circuitry 110 can support acquisition of a variety of sampled inputs. The sensing circuitry 110 may also support a higher rate or a lower rate of data acquisition depending upon the type of parameter being monitored. For instance, temperature and pressure values can be relatively low rate of change parameters without a substantially cyclic component, and thus can be sampled relatively infrequently. In contrast, vibration data from an accelerometer include cyclic frequency components and must be sampled at least twice the rate of the highest frequency of interest. For cyclic data, a sampled set of sensor data may be collected over a period of time in order to obtain multiple cycles of a substantially continuous waveform to support frequency domain processing, such as a Fourier transform. For instance, if the sensing circuitry 110a is an accelerometer, the wireless sensor node 104a can acquire 2,048 samples of sensor data before sending the sensor data back to the wireless access point 106. The wireless sensor node 104a can make sure that a full buffer of samples (e.g., all 2,048 samples) has been acquired before sending the sensor data in one or more heartbeat messages to the wireless access point 106. For example, the 2,048 data samples may be divided into about one hundred separate heartbeat messages. As another example, the wireless sensor node 104b can capture and send samples acquired from the sensing circuitry 110b and 110c to the wireless access point 106 as part of a same heartbeat message, either periodically or on demand.

To provide periodic status when no samples of sensor data are available to transmit, each of the wireless sensor nodes 104 can transmit a heartbeat message at a first heartbeat message rate to the wireless access point 106. The first heartbeat message rate may be relatively slow, for instance, once every two minutes. Status information in the heartbeat message enables the server 102 to monitor the health of each wireless sensor node 104 and ensure that each of the wireless sensor nodes 104 is available to acquire sensor data as needed. When the status information includes power supply information, the server 102 can alert an operator of the system 100 if one or more of the wireless sensor nodes 104 needs servicing, such as battery replacement.

At each of the wireless sensor nodes 104, upon determining that samples of sensor data are available to transmit, the respective wireless sensor node 104 can increase the heartbeat message rate to a second heartbeat message rate to quickly relay the sensor data. As one example, the second heartbeat message rate can be one heartbeat message every two seconds. The wireless sensor system 103 can support multiple heartbeat message rates, such that wireless sensor node 104a may transmit heartbeat messages with sensor data at the second heartbeat message rate while the wireless sensor node 104b can transmit heartbeat messages with sensor data at a third heartbeat message rate that is different from the second heartbeat message rate and greater than the first heartbeat message rate. As one example, where the sensing circuitry 110a acquires cyclic sensor data and the sensing circuitry 110b and 110c acquires non-cyclic sensor data, the second heartbeat message rate of the wireless sensor node 104a can be greater than the third heartbeat message rate of the wireless sensor node 104b. Both the wireless sensor nodes 104a and 104b revert back to the first heartbeat message rate upon transmitting their respective sensor data to the wireless access point 106. The sensor data received at the wireless access point 106 is reported to the server 102, where it can be monitored, stored, and/or relayed to an operator or other portion of the system 100.

Figure 2:
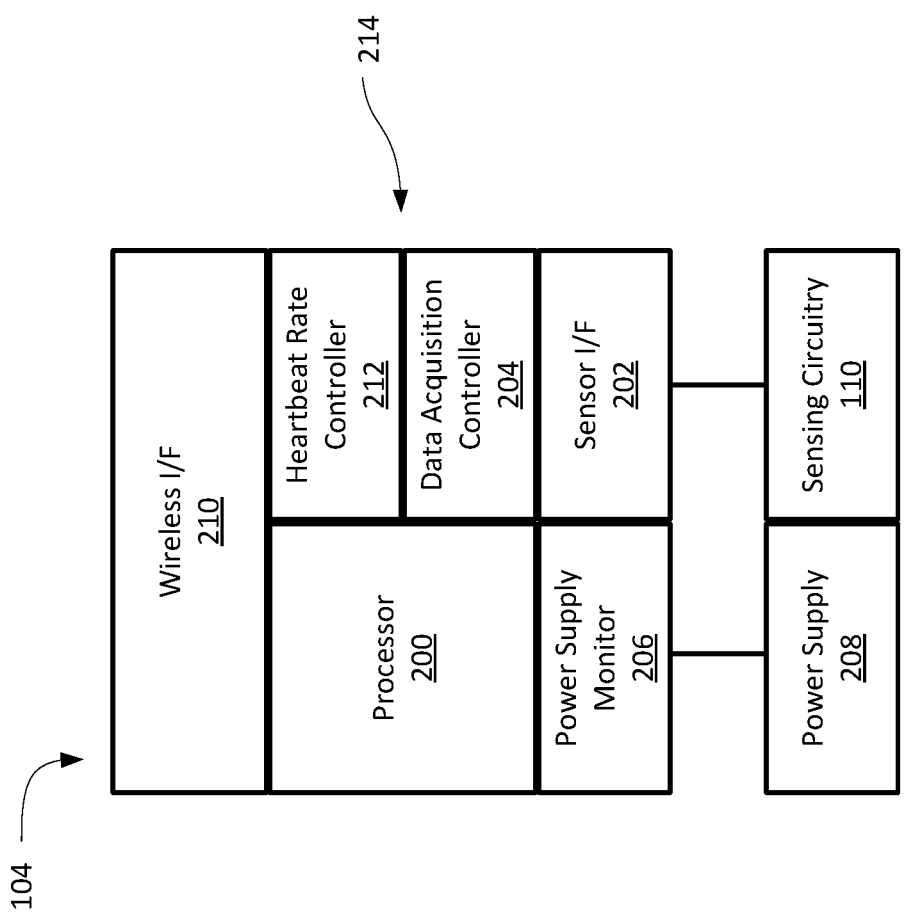
FIG. 2 schematically depicts a wireless sensor node in accordance with an embodiment.

FIG. 2 schematically depicts an instance of the wireless sensor node 104 of FIG. 1 in accordance with an embodiment. In the example of FIG. 2, the wireless sensor node 104 includes a sensor interface 202 that interfaces with sensing circuitry 110. The wireless sensor node 104 also includes a data acquisition controller 204 to acquire sensor data via the sensor interface 202. A power supply monitor 206 determines status of a power supply 208 of the wireless sensor node 104. The power supply 208 can be a battery and/or an energy harvester (e.g., producing power from solar, wind, motion, etc.) to power the wireless sensor node 104. The power supply monitor 206 can determine a voltage level available, current draw, estimated life remaining and the like from the power supply 208. A wireless interface 210 enables communication with the wireless access point 106 of FIG. 1. The wireless sensor node 104 also includes a heartbeat rate controller 212 to control the rate of sending heartbeat messages on the wireless interface 210.

The data acquisition controller 204, power supply monitor 206, and heartbeat rate controller 212 can all be embodied as instructions stored in memory 214 that can be executed by at least one processor 200 to cause the wireless sensor node 104 to perform functions of the data acquisition controller 204, power supply monitor 206, and heartbeat rate controller 212. Processor 200 can be any type or combination of computer processors, such as a microprocessor, microcontroller, digital signal processor, application specific integrated circuit, programmable logic device, and/or field programmable gate array. The memory 214 is an example of a non-transitory computer readable storage medium tangibly embodied in the wireless sensor node 104 including executable instructions stored therein, for instance, as firmware. The wireless sensor node 104 may implement a protocol stack, when communicating with the wireless access point 106 of FIG. 1. One example of a protocol stack is the Internet protocol suite that defines a physical/link layer, an Internet layer, a transport layer, and an application layer. In the example of FIG. 2, the heartbeat rate controller 212 operates at the application layer to control the heartbeat message rate of the wireless sensor node 104.

In an exemplary embodiment, the heartbeat rate controller 212 causes the wireless sensor node 104 to set a heartbeat message rate of the wireless sensor node 104 to a first heartbeat message rate to periodically send heartbeat messages including the status of the power supply 208 to the wireless access point 106 of FIG. 1. The heartbeat rate controller 212 increases the heartbeat message rate to a second heartbeat message rate to transmit sensor data acquired by the data acquisition controller 204 in one or more heartbeat messages to the wireless access point 106 of FIG. 1 based on a determination that the sensor data have been acquired and are ready to transmit. The heartbeat rate controller 212 lowers the heartbeat message rate back to the first heartbeat message rate based on a determination that all of the sensor data have been transmitted on the wireless interface 210.

The wireless interface 210 can also determine a communication error rate with respect to the wireless access point 106 of FIG. 1. The heartbeat rate controller 212 may reduce the second heartbeat message rate based on detection of an increased communication error rate. For instance, if multiple instances of the wireless sensor node 104 are attempting to provide the wireless access point 106 with sensor data at about the same time and at a higher rate, the wireless access point 106 or a communication channel shared between the wireless access point 106 and the wireless sensor nodes 104 may become overwhelmed. Reduction of the second heartbeat message rate to a level that is still greater than the first heartbeat message rate may reduce latency while also lowering communication retry attempts. The server 102, wireless access point 106, and/or gateway 108 of FIG. 1 may also monitor for communication and throughput issues. For example, if the server 102 determines that it cannot keep up with the faster data rate of the second heartbeat message rate, the server 102 can send a node configuration message to the wireless sensor node 104 requesting reduction of the second heartbeat message rate.

Further, the power supply monitor 206 can determine a power level of the power supply 208. As the power level is reduced below a low power operation threshold, the heartbeat rate controller 212 can also reduce the second heartbeat message rate. Since each transmission of the wireless interface 210 may further reduce the power level of the power supply 208, reduction of the second heartbeat message rate may further extend the operational life of the wireless sensor node 104 until the power supply 208 can be serviced. There can be multiple low power operation thresholds that incrementally reduce the second heartbeat message rate toward the first heartbeat rate as the power level of the power supply 208 drops over time. Similarly, if the power level of the power supply 208 increases, the second heartbeat message rate may also be increased.

Figure 3:
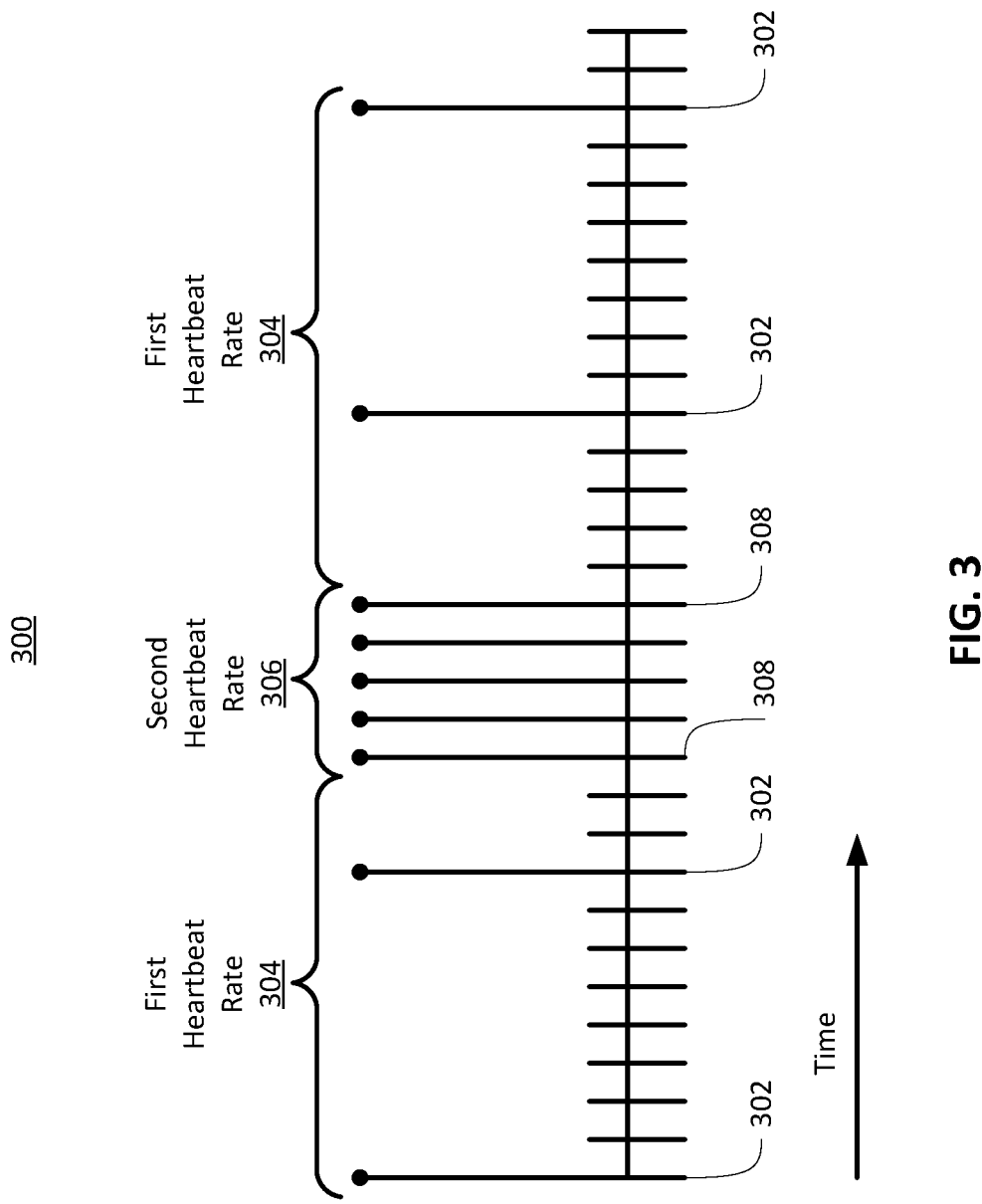
FIG. 3 depicts an example timing diagram in accordance with an embodiment.

FIG. 3 depicts an example timing diagram 300 in accordance with an embodiment. As illustrated in FIG. 3, heartbeat messages 302 that include status information can be periodically sent at a first heartbeat message rate 304, for instance, from wireless sensor node 104a of FIG. 1 to the wireless access point 106 of FIG. 1. The heartbeat message rate of the wireless sensor node 104a of FIG. 1 can be set to a second heartbeat message rate 306 to transmit sensor data in one or more heartbeat messages 308 to the wireless access point 106 of FIG. 1 based on a determination that samples of the sensor data have been acquired and are ready to transmit. The heartbeat message rate is lowered back to the first heartbeat message rate 304 based on a determination that all of the sensor data have been transmitted and heartbeat messages 302 including status information are again periodically sent. As can be seen in the example of FIG. 3, the second heartbeat message rate 306 is about eight times the first heartbeat message rate 304; however, the second heartbeat message rate 306 can be any rate that is greater than the first heartbeat message rate 304.

Figure 4:
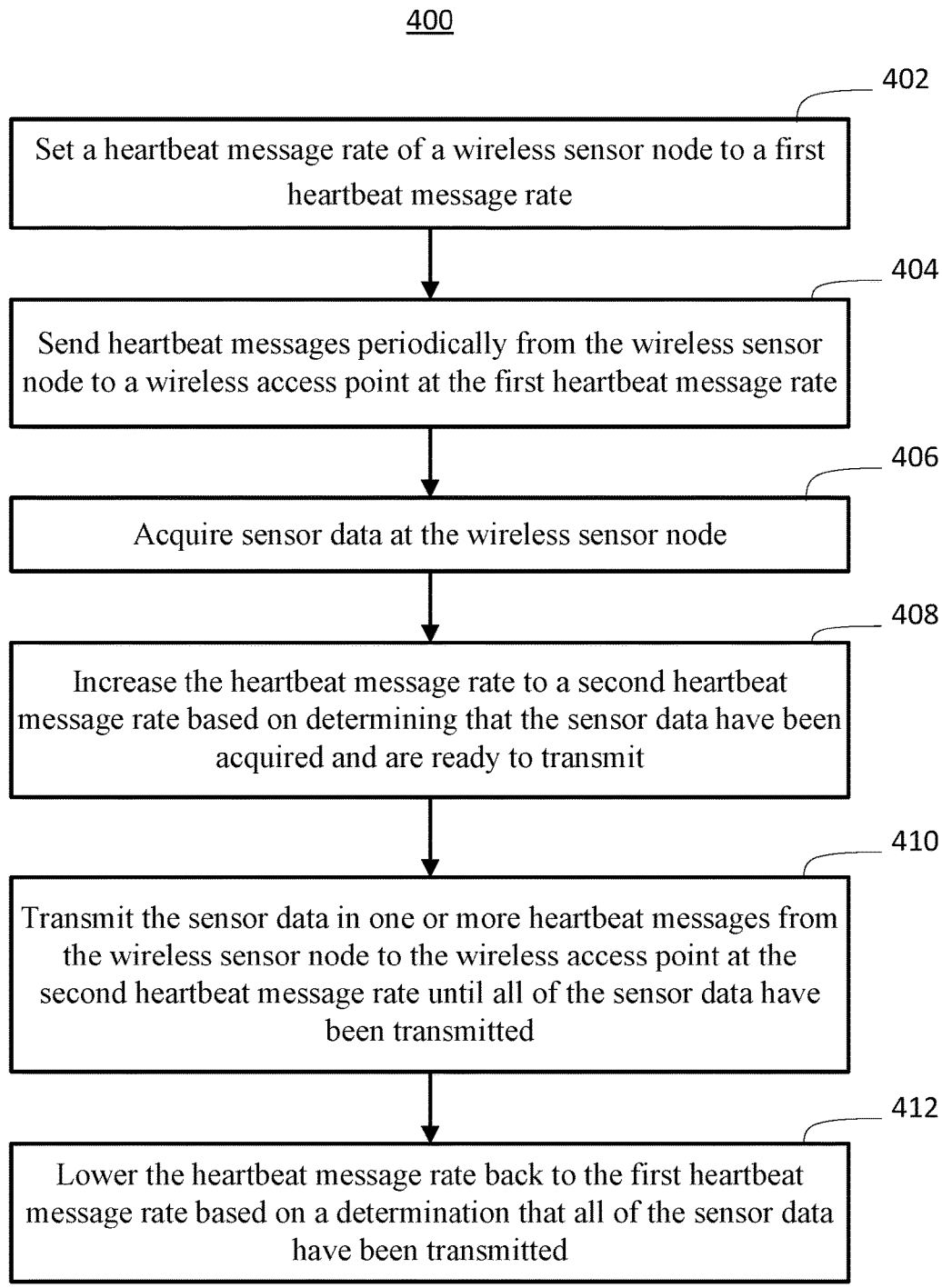
FIG. 4 depicts a process for dynamic heartbeat message rate adjustment in a wireless sensor system in accordance with an embodiment.

FIG. 4 depicts a process 400 for dynamic heartbeat message rate adjustment in a wireless sensor system in accordance with an embodiment. The process 400 as depicted in FIG. 4 can include additional elements beyond those depicted in FIG. 4 and may be applicable to elements as described in reference to FIGS. 1-3. For purposes of explanation, the process 400 is described in reference to FIGS. 1-4.

At block 402, a heartbeat message rate of a wireless sensor node 104 is set to a first heartbeat message rate 304. At block 404, heartbeat messages 302 are sent periodically from the wireless sensor node 104 to the wireless access point 106 at the first heartbeat message rate 304. At block 406, one or more samples of sensor data are acquired at the wireless sensor node 104. At block 408, the heartbeat message rate is increased to the second heartbeat message rate 306 based on determining that the sensor data have been acquired and are ready to transmit. At block 410, the sensor data are transmitted in one or more heartbeat messages 308 from the wireless sensor node 104 to the wireless access point 106 at the second heartbeat message rate 306 until all of the sensor data have been transmitted. At block 412, the heartbeat message rate is lowered back to the first heartbeat message rate 304 based on a determination that all of the sensor data have been transmitted.

The heartbeat messages 302 sent at the first heartbeat message rate 304 can include status information, and the one or more heartbeat messages 308 sent at the second heartbeat message rate 306 may include the status information and the sensor data. The status information can include a status of the power supply 208 of the wireless sensor node 104. The wireless sensor node 104 may reduce the second heartbeat message rate 306 based on a determination that a power level of the power supply 208 is below a low power operation threshold.

In an exemplary embodiment, sensor data are transmitted from a second wireless sensor node 104b to the wireless access point 106 at a third heartbeat message rate that is greater than the first heartbeat message rate. The third heartbeat message rate can be the same rate, a greater rate, or a lower rate relative to the second heartbeat message rate. For example, the second and third heartbeat message rates can be the same where the sensing circuitry 110 is of the same type at the wireless sensor node 104a and the second wireless sensor node 104b. Alternatively, the second and third heartbeat message rates can be different where the wireless sensor node 104a interfaces with a first type of sensing circuitry 110a and the second wireless sensor node 104b interfaces with a second type of sensing circuitry 110b and 110c that has a different sampling rate than the first type of sensing circuitry 110a. The first heartbeat message rate, the second heartbeat message rate, and the third heartbeat message rate can be configurable by the server 102 operably coupled to the wireless access point 106. Heartbeat message rates can be configured by the server 102 using a node configuration message targeting one or more wireless sensor nodes 104. The server 102 may request modification of one or more of the heartbeat message rates for various reasons, such as throughput issues detected in the system 100. The wireless sensor nodes 104 may also be configurable to communicate with the wireless access point 106 at a rate greater than the first heartbeat message rate for wireless sensor node firmware update transmissions (e.g., to update one or more of the data acquisition controller 204, power supply monitor 206, and heartbeat rate controller 212). The wireless sensor node 104a may also monitor a communication error rate with respect to the wireless access point 106 and reduce the second heartbeat message rate based on detection of an increased communication error rate.

Technical effects include a dynamic heartbeat message rate adjustment in a wireless sensor system. Adjusting a heartbeat message rate can conserve power while reducing latency by increasing the heartbeat message rate when sensor data are available and reducing the heartbeat message rate when no sensor data are available to transmit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A wireless sensor system comprising a wireless sensor node, the wireless sensor node comprising:
    a sensor interface that interfaces with sensing circuitry;
    a wireless interface to communicate with a wireless access point;
    at least one processor; and
    memory having instructions stored thereon that, when executed by the at least one processor, cause the wireless sensor node to:
        set a heartbeat message rate of the wireless sensor node to a first heartbeat message rate;
        send heartbeat messages periodically on the wireless interface to the wireless access point at the first heartbeat message rate;
        acquire sensor data through the sensor interface, the sensor data being stored in a data buffer;
        increase the heartbeat message rate to a second heartbeat message rate based on a determination that the data buffer is full;
        transmit the sensor data in one or more heartbeat messages on the wireless interface to the wireless access point at the second heartbeat message rate until all of the sensor data have been transmitted; and
        lower the heartbeat message rate back to the first heartbeat message rate based on a determination that all of the sensor data in the data buffer have been transmitted,
        wherein the heartbeat messages sent at the first heartbeat message rate comprise status information and the one or more heartbeat messages sent at the second heartbeat message rate comprise the status information and the sensor data.

2. The wireless sensor system of claim 1, wherein the heartbeat messages sent at the first heartbeat message rate comprise status information and the one or more heartbeat messages sent at the second heartbeat message rate comprise the status information and the sensor data.

3. The wireless sensor system of claim 2, wherein the status information comprises a status of a power supply of the wireless sensor node.

4. The wireless sensor system of claim 3, wherein the wireless sensor node reduces the second heartbeat message rate based on a determination that a power level of the power supply is below a low power operation threshold.

5. The wireless sensor system of claim 1, further comprising a second wireless sensor node, wherein the second wireless sensor node transmits sensor data at a third heartbeat message rate that is greater than the first heartbeat message rate.

6. The wireless sensor system of claim 5, wherein the first heartbeat message rate, the second heartbeat message rate, and the third heartbeat message rate are configurable by a server operably coupled to the wireless access point.

7. The wireless sensor system of claim 5, wherein the wireless sensor node interfaces with a first type of the sensing circuitry and the second wireless sensor node interfaces with a second type of the sensing circuitry that has a different sampling rate than the first type of the sensing circuitry.

8. The wireless sensor system of claim 1, wherein the wireless sensor node monitors a communication error rate with respect to the wireless access point and reduces the second heartbeat message rate based on detection of an increased communication error rate.

9. The wireless sensor system of claim 1, wherein the wireless sensor node is configurable to communicate with the wireless access point at a rate greater than the first heartbeat message rate for wireless sensor node firmware update transmissions.

10. A method of dynamic heartbeat message rate adjustment in a wireless sensor system, the method comprising:
    setting a heartbeat message rate of a wireless sensor node to a first heartbeat message rate;
    sending heartbeat messages periodically from the wireless sensor node to a wireless access point at the first heartbeat message rate;
    acquiring sensor data at the wireless sensor node, the sensor data being stored in a data buffer;

increasing the heartbeat message rate to a second heartbeat message rate based on determining that the data buffer is full;

transmitting the sensor data in one or more heartbeat messages from the wireless sensor node to the wireless access point at the second heartbeat message rate until all of the sensor data have been transmitted; and lowering the heartbeat message rate back to the first heartbeat message rate based on a determination that all of the sensor data in the data buffer have been transmitted.

11. The method of claim 10, wherein the heartbeat messages sent at the first heartbeat message rate comprise status information and the one or more heartbeat messages sent at the second heartbeat message rate comprise the status information and the sensor data.

12. The method of claim 11, wherein the wireless sensor node reduces the second heartbeat message rate based on a determination that a power level of the power supply is below a low power operation threshold.

13. The method of claim 10, further comprising: transmitting sensor data from a second wireless sensor node to the wireless access point at a third heartbeat message rate that is greater than the first heartbeat message rate, wherein the first heartbeat message rate, the second heartbeat message rate, and the third heartbeat message rate are configurable by a server operably coupled to the wireless access point.

14. The method of claim 13, wherein the wireless sensor node interfaces with a first type of sensing circuitry and the second wireless sensor node interfaces with a second type of sensing circuitry that has a different sampling rate than the first type of sensing circuitry.

15. The method of claim 10, further comprising: monitoring a communication error rate with respect to the wireless access point; and reducing the second heartbeat message rate based on detecting an increased communication error rate.

16. The method of claim 10, further comprising: resuming sending the heartbeat messages periodically from the wireless sensor node to the wireless access point at the first heartbeat message rate subsequent to the heartbeat message rate being lowered back to the first heartbeat message rate.

* * * * *